(12) United States Patent
Beers et al.

(10) Patent No.: US 8,784,048 B2
(45) Date of Patent: Jul. 22, 2014

(54) AIR CYCLE MACHINE BEARING COOLING INLET PLATE

(75) Inventors: Craig M. Beers, Wethersfield, CT (US); Brent J. Merritt, Southwick, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 639 days.

(21) Appl. No.: 12/974,172

(22) Filed: Dec. 21, 2010

(65) Prior Publication Data

US 2012/0156014 A1  Jun. 21, 2012

(51) Int. Cl.
*F01D 5/08* (2006.01)

(52) U.S. Cl.
USPC .......................................... 415/180

(58) Field of Classification Search
USPC .................... 415/110; 384/317, 320
See application file for complete search history.

(56) References Cited

U.S. PATENT DOCUMENTS

| | | | |
|---|---|---|---|
| 4,378,134 A | 3/1983 | Eddy | |
| 5,113,670 A | 5/1992 | McAuliffe et al. | |
| 5,309,735 A | 5/1994 | Maher, Jr. et al. | |
| 6,232,683 B1 | 5/2001 | Hirai et al. | |
| 6,238,179 B1 * | 5/2001 | Wunderwald et al. | 415/110 |
| 6,467,960 B1 | 10/2002 | Watson et al. | |
| 6,571,461 B2 | 6/2003 | Probst | |
| 6,752,533 B2 | 6/2004 | Saville et al. | |
| 6,909,581 B2 | 6/2005 | Gavit et al. | |
| 6,913,636 B2 | 7/2005 | Defrancesco et al. | |
| 7,342,332 B2 | 3/2008 | McAuliffe et al. | |
| 7,394,175 B2 | 7/2008 | McAuliffe et al. | |
| 7,402,020 B2 | 7/2008 | Beers et al. | |
| 7,648,279 B2 | 1/2010 | Struziak et al. | |
| 7,648,780 B2 | 1/2010 | Son et al. | |
| 7,704,056 B2 | 4/2010 | Masoudipour et al. | |
| 8,177,475 B2 * | 5/2012 | Joco et al. | 415/1 |
| 2008/0246281 A1 | 10/2008 | Agrawal et al. | |
| 2009/0274548 A1 | 11/2009 | Joco et al. | |

FOREIGN PATENT DOCUMENTS

CN  1776235 A  5/2006

OTHER PUBLICATIONS

U.S. Appl. No. 12/868,967, filed Aug. 26, 2010, "Compressor Bearing Cooling Inlet Plate".
U.S. Appl. No. 12/728,306, filed Mar. 22, 2010, "Journal Bearing With Dual Pass Cooling for Air Machine".
U.S. Appl. No. 12/728,313, filed Mar. 22, 2010, "Thrust Bearing Cooling Path".

\* cited by examiner

*Primary Examiner* — Nathaniel Wiehe
*Assistant Examiner* — Jeffrey A Brownson
(74) *Attorney, Agent, or Firm* — Carlson, Gaskey & Olds, P.C.

(57) ABSTRACT

An air cycle machine includes a housing, and a shaft rotationally supported within the housing includes a thrust runner. Air bearings are provided on either side of the thrust runner. An inlet plate is arranged radially outward of the air bearings. The inlet plate has inner and outer peripheries provided between lateral sides. One side includes four circumferentially arranged slots extending from the outer periphery to the inner periphery and having a width and a depth providing a first ratio of 4:1.

13 Claims, 2 Drawing Sheets

AIR CYCLE MACHINE BEARING COOLING INLET PLATE

BACKGROUND

This disclosure relates to a bearing cooling inlet plate that supplies cooling air to thrust bearings of an air cycle machine.

An air cycle machine may include a centrifugal compressor and a centrifugal turbine mounted for co-rotation on a shaft within a housing. The centrifugal compressor further compresses partially compressed air, such as bleed air received from a compressor of a gas turbine engine. The compressed air discharges to a downstream heat exchanger or other use before returning to the centrifugal turbine. The compressed air expands in the turbine to thereby drive the compressor. The air output from the turbine may be utilized as an air supply for a vehicle, such as the cabin of an aircraft. Air within the air cycle machine is routed to journal and thrust air bearings.

SUMMARY

An air cycle machine includes a housing, and a shaft rotationally supported within the housing includes a thrust runner. Air bearings are provided on either side of the thrust runner. An inlet plate is arranged radially outward of the air bearings. The inlet plate has inner and outer peripheries provided between lateral sides. One side includes four circumferentially arranged slots extending from the outer periphery to the inner periphery and having a width and a depth providing a first ratio of 4:1.

BRIEF DESCRIPTION OF THE DRAWINGS

The disclosure can be further understood by reference to the following detailed description when considered in connection with the accompanying drawings wherein.

DETAILED DESCRIPTION

Figure 1:
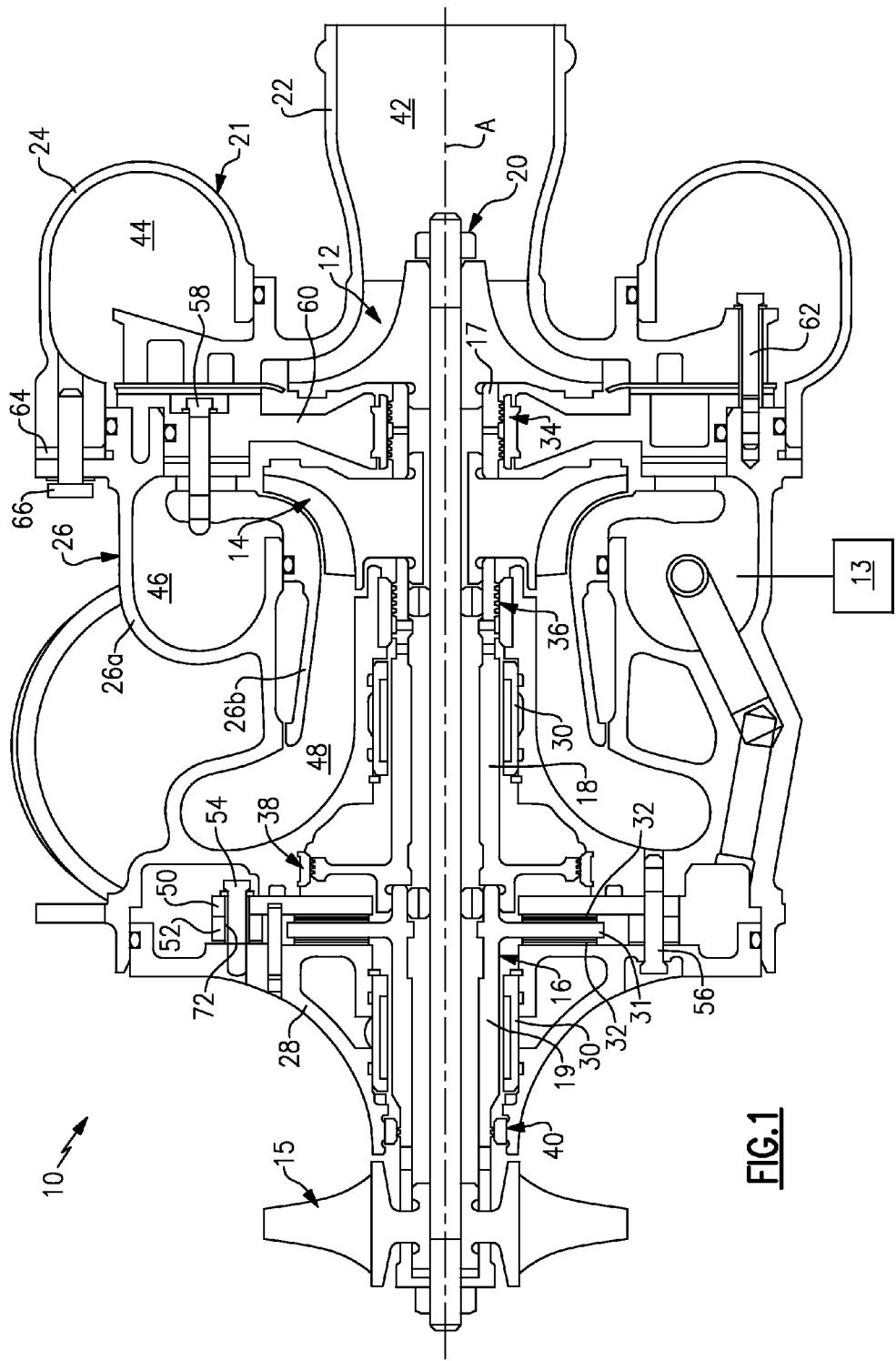
FIG. 1 is a cross-section of an example air cycle machine.

FIG. 1 illustrates an air cycle machine (ACM) 10 having a compressor 12 coupled to a turbine 14 by a shaft 16, which is stainless steel for example, for rotation together about an axis A. The turbine 14 is incorporated into a cabin air supply system 13 for providing conditioned air to an aircraft, for example. A fan 15 supported by the shaft 16 circulates the conditioned air within the cabin air supply system 13.

The ACM 10 is constructed from multiple portions to facilitate assembly. For example, the ACM 10 includes a housing 21 having inlet, compressor, turbine and bearing housing portions 22, 24, 26, 28. The example shaft 16 is constructed from multiple portions also. For example, the compressor 12 is mounted on first shaft portion 17 and arranged within the inlet housing portion 22; the turbine 14 is mounted between first and second shaft portions 17, 18 within the turbine housing portion 26; and a third shaft portion 19 is mounted within the bearing housing portion 28. A tie rod 20 secures the compressor 12, turbine 14, fan 15 and first, second, third shaft portions 17, 18, 19 to one another.

Journal bearings 30 rotationally support the second and third shaft portions 18, 19 respectively within the turbine and bearing housing portions 26, 28. A thrust runner 31 extends radially from the third shaft portion 19 and is axially arranged between thrust bearings 32. A retaining plate 50 is secured to the bearing housing portion 28 about the thrust runner 31 and thrust bearings 32 by first fasteners 54. An inlet plate 52 is provided between the bearing housing portion 28 and the retaining plate 50 radially outward of the thrust runner 31 to control the flow of lubricating air to the thrust bearings 32. Second fasteners 56 secure the bearing and turbine housing portions 28, 26 to one another.

The housing portions are sealed relative to one another to contain the compressed air within the desired passageways within the ACM. However, the seals also are designed to control the amount of air leakage from the compressor 12 and the turbine 14 within the ACM 10 to lubricate the journal and thrust bearings 30, 32. In the example, a first seal 34 is arranged between the first shaft portion 17 and an intermediate housing portion 60; second and third seals 36, 38 are arranged between the second shaft portion 18 and the turbine housing portion 26; and a fourth seal 40 is arranged between the third shaft portion 19 and the bearing housing portion 28.

The inlet housing portion 22 provides a compressor inlet 42, and the compressor housing portion 24 provides a compressor outlet 44. The turbine housing portion 26, which includes first and second turbine housing portions 26a, 26b, provides a turbine inlet 46 and a turbine outlet 48. Third fasteners 58 secure the turbine and intermediate housing portions 26, 60 to one another, and fourth fasteners 62 secure the inlet and turbine housing portions 22, 26 to one another.

A seal plate 64 is secured between the compressor and turbine housing portions 24, 26 by fifth fasteners 66. Air flows into the compressor inlet 42 and is compressed centrifugally to compressor outlet 44 where it is routed to turbine inlet 46. The compressed air expands through the turbine 14 and exits the turbine outlet 48.

Figure 3:
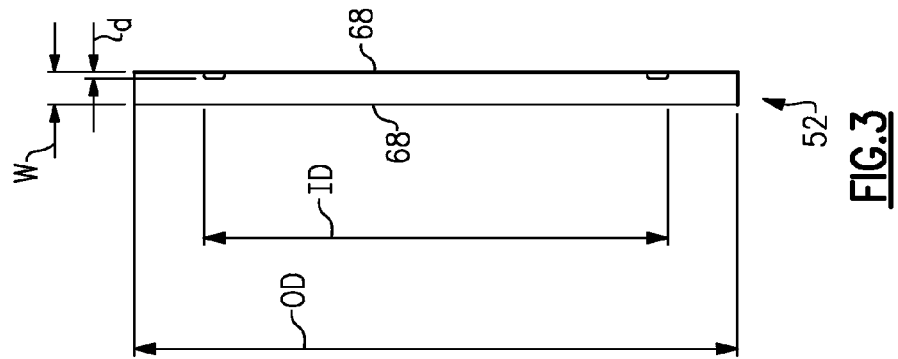
FIG. 3 is a side elevational view of the inlet plate illustrated in FIG. 2.
Figure 2:
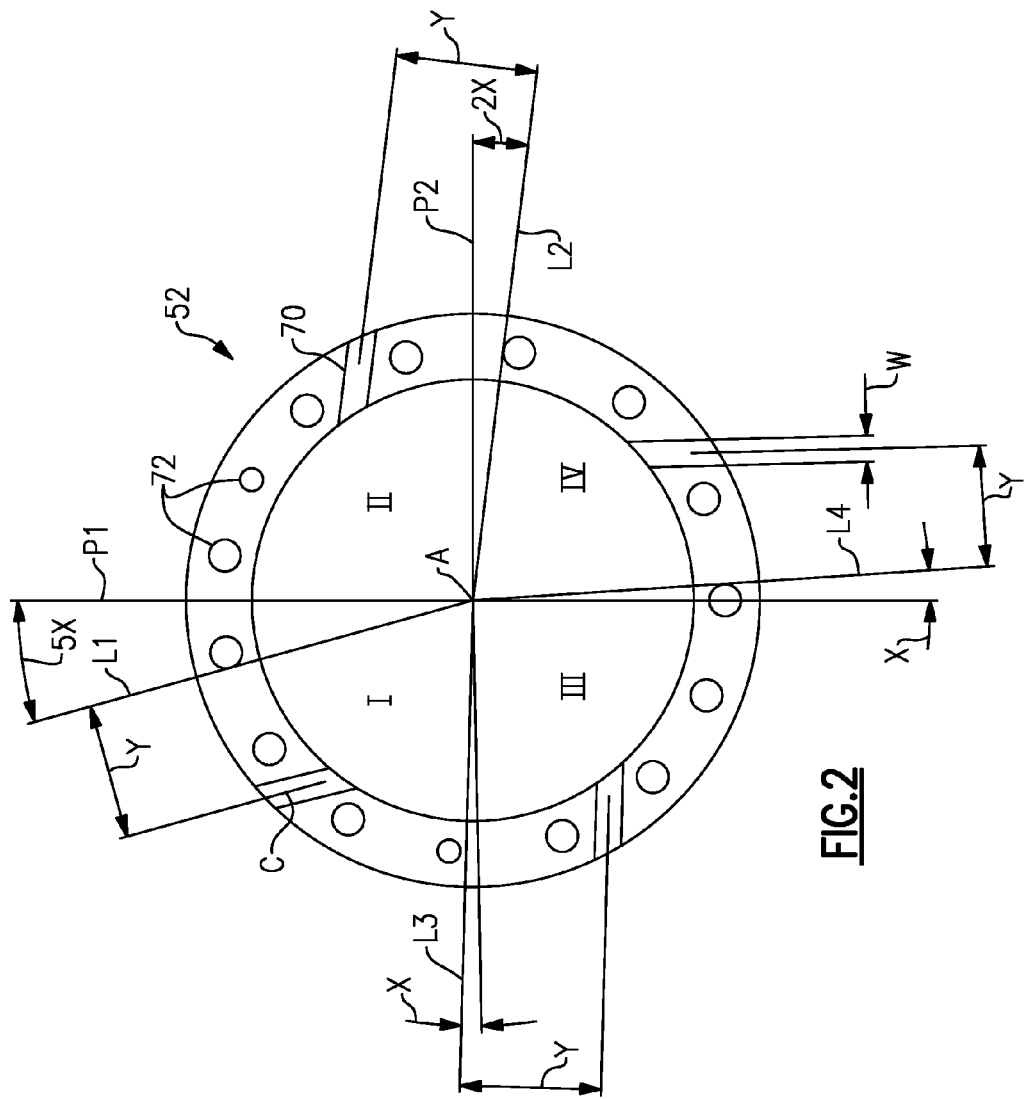
FIG. 2 is a top elevational view of an bearing cooling inlet plate of the ACM of FIG. 1.

Referring to FIGS. 2 and 3, the inlet plate 52 has inner and outer peripheries, or diameters ID, OD, provided between lateral sides 68 that provide a width W, which is nominally 0.220 inch (5.59 mm). The outer and inner diameters OD/ID provide a ratio of 1.28-1.30. The outer diameter OD is nominally 3.945 inch (100.20 mm), and the inner diameter ID is nominally 3.060 inch (77.72 mm). One side includes four circumferentially arranged slots 70 extending from the outer periphery to the inner periphery and having a width w and a depth d providing a first ratio of 4:1. The width w is nominally 0.160 inch (4.06 mm) and the depth d is nominally 0.040 inch (1.02 mm).

The slots 70 are misaligned with the axis A. A slot is provided in each of four quadrants I, II, III, IV defined by two perpendicular planes P1, P2. The centers C of the slots 70 are spaced at a same distance Y, nominally 0.915 inch (23.24 mm), from a multiple of an angle X (X=3 degrees) taken from one of the perpendicular planes. The first and second quadrants I, II are on one side the first perpendicular plane P1, and the first and third quadrants I, III are diagonal from one another.

A center of a slot is provided in the first quadrant I at the distance Y parallel to a first line L1 lying in the first quadrant I at five times the angle X from the first perpendicular plane P1. A center of a second slot is provided in the second quadrant II at the distance Y parallel to second line L2 lying in the fourth quadrant IV at the angle X from the second perpendicular plane P2. A center of a third slot is provided in the third quadrant III at the distance Y parallel to a third line L3 lying in the first quadrant I at the angle X from the second perpendicular plane P2. A center of a fourth slot is provided in the fourth quadrant IV at the distance Y parallel to a fourth line L4 lying in the fourth quadrant IV at the angle X from the second perpendicular plane P2.

The lateral sides 68 lie within parallel planar surfaces and include circumferentially arranged attaching apertures 72 extending to the sides. Three apertures are arranged between each of two pairs of slots, four apertures are arranged between another pair of slots, and five apertures are arranged between yet another pair of slots.

Although an example embodiment has been disclosed, a worker of ordinary skill in this art would recognize that certain modifications would come within the scope of the claims. For that reason, the following claims should be studied to determine their true scope and content.

What is claimed is:

1. A compressor bearing cooling inlet plate comprising:
   a body having inner and outer peripheries provided between lateral sides, one side include four circumferentially arranged slots extending from the outer periphery to the inner periphery, the slots having a width and a depth providing a first ratio of 4:1, wherein the width is nominally 0.160 inch and the depth is nominally 0.040 inch, the outer and inner peripheries correspond to outer and inner diameters, the outer diameter to inner diameter providing a second ratio of 1.28-1.30, and the outer diameter is nominally 3.945 inch.

2. The inlet plate according to claim 1, wherein a slot is provided in each of four quadrants defined by two perpendicular planes.

3. The inlet plate according to claim 2, wherein the centers of the slots are spaced at a same distance from a multiple of an angle taken from one of the perpendicular planes.

4. The inlet plate according to claim 3, wherein the first and second quadrants are on one side of one of the perpendicular planes and the first and third quadrants are diagonal from one another,
   a first center of a first slot is provided in a first quadrant at the distance parallel to a first line lying in the first quadrant at five times the angle from a first perpendicular plane,
   a second center of a second slot is provided in a second quadrant at the distance parallel to second line lying in the fourth quadrant at the angle from the second perpendicular plane,
   a third center of a third slot is provided in a third quadrant at the distance parallel to a third line lying in the first quadrant at the angle from the second perpendicular plane, and
   a fourth center of a fourth slot is provided in a fourth quadrant at the distance parallel to a fourth line lying in the fourth quadrant at the angle from the second perpendicular plane.

5. The inlet plate according to claim 1, wherein the lateral sides lie within parallel planar surfaces and include circumferentially arranged attaching apertures extending from one side to the other side.

6. The inlet plate according to claim 5, wherein three apertures are arranged between each of two pairs of slots, four apertures are arranged between another pair of slots, and five apertures are arranged between yet another pair of slots.

7. The inlet plate according to claim 1, wherein the slots are misaligned with an axis of the inlet plate.

8. An air cycle machine comprising:
   a housing;
   a shaft rotationally supported within the housing and including a thrust runner;
   air bearings provided on either side of the thrust runner; and
   an inlet plate arranged radially outward of and axially aligned with the air bearings, the inlet plate having inner and outer peripheries provided between lateral sides, one side include four circumferentially arranged slots extending from the outer periphery to the inner periphery, the slots having a width and a depth providing a first ratio of 4:1, the inlet plate configured to provide fluid to the air bearings through the slots, wherein the width is nominally 0.160 inch and the depth is nominally 0.040 inch, the outer and inner peripheries correspond to outer and inner diameters, the outer diameter to inner diameter providing a second ratio of 1.28-1.30, and the outer diameter is nominally 3.945 inch.

9. The air cycle machine according to claim 8, wherein a slot is provided in each of four quadrants defined by two perpendicular planes.

10. The air cycle machine according to claim 9, wherein the centers of the slots are spaced at a same distance from a multiple of an angle taken from one of the perpendicular planes.

11. The air cycle machine according to claim 10, wherein the first and second quadrants are on one side of one of the perpendicular planes and the first and third quadrants are diagonal from one another,
    a first center of a first slot is provided in a first quadrant at the distance parallel to a first line lying in the first quadrant at five times the angle from a first perpendicular plane,
    a second center of a second slot is provided in a second quadrant at the distance parallel to second line lying in the fourth quadrant at the angle from the second perpendicular plane,
    a third center of a third slot is provided in a third quadrant at the distance parallel to a third line lying in the first quadrant at the angle from the second perpendicular plane, and
    a fourth center of a fourth slot is provided in a fourth quadrant at the distance parallel to a fourth line lying in the fourth quadrant at the angle from the second perpendicular plane.

12. The air cycle machine according to claim 8, wherein the lateral sides lie within parallel planar surfaces and include circumferentially arranged attaching apertures extending from one side to the other side, wherein three apertures are arranged between each of two pairs of slots, four apertures are arranged between another pair of slots, and five apertures are arranged between yet another pair of slots.

13. A method of assembling an air cycle machine comprising the steps of:
    inserting a shaft having a thrust runner into a bearing housing;
    arranging thrust bearings on either side of the thrust runner;
    providing an inlet plate having inner and outer peripheries provided between lateral sides, one side include four circumferentially arranged slots extending from the outer periphery to the inner periphery, the slots having a width and a depth providing a first ratio of 4:1, wherein the width is nominally 0.160 inch and the depth is nominally 0.040 inch, the outer and inner peripheries correspond to outer and inner diameters, the outer diameter to inner diameter providing a second ratio of 1.28-1.30, and the outer diameter is nominally 3.945 inch;
    arranging the inlet plate radially outward of and axially aligned with the thrust bearings, the inlet plate configured to provide fluid to the thrust bearings through the slots; and
    securing the inlet plate to the bearing housing.

* * * * *